Sept. 6, 1955
C. A. LOVELL
2,717,280
SIGNALING OR DIALING SYSTEM
Filed March 1, 1954
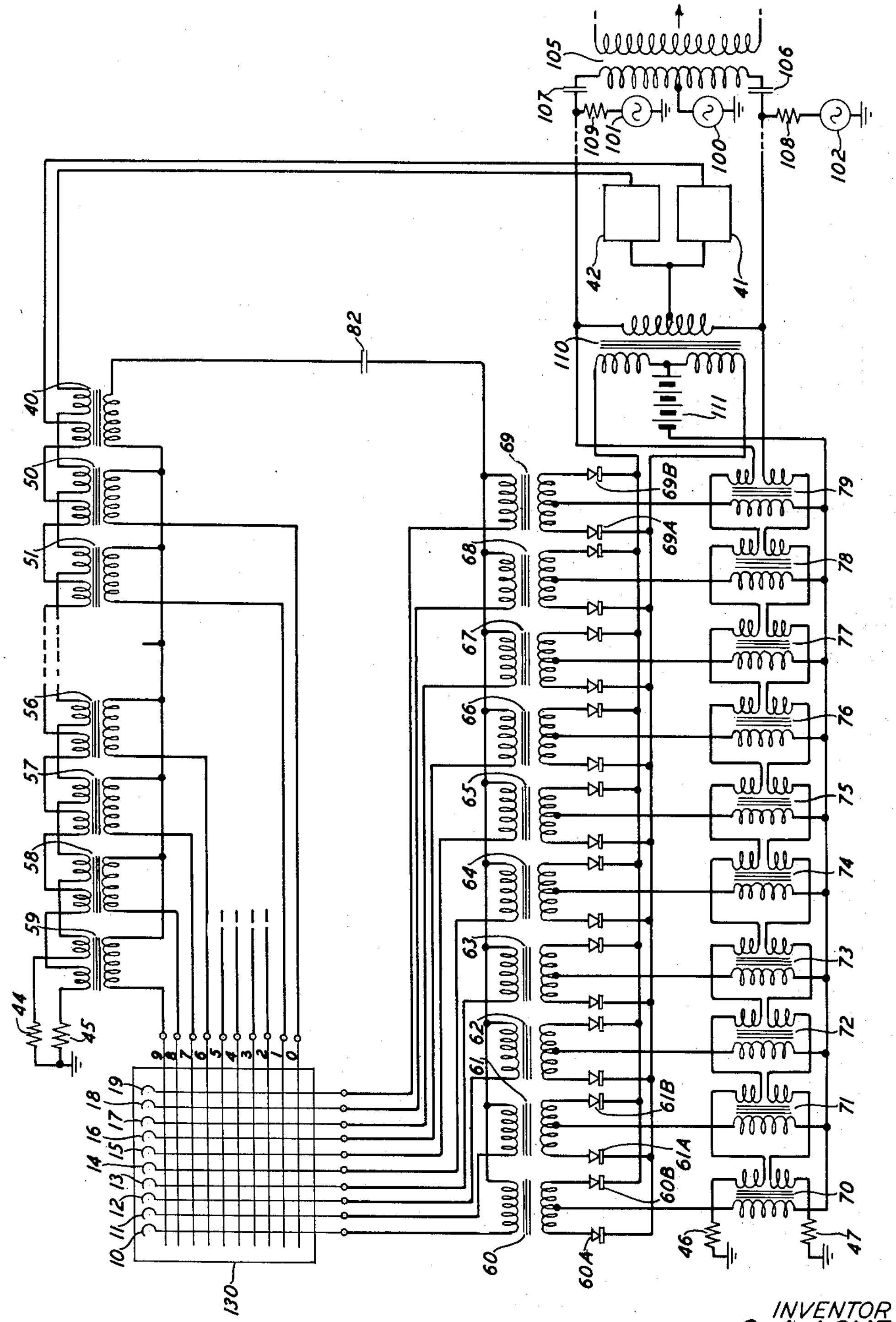
INVENTOR
C. A. LOVELL
BY William F. Simpson,
ATTORNEY United States Patent Office 2,717,280
Patented Sept. 6, 1955

2,717,280

SIGNALING OR DIALING SYSTEM

Clarence A. Lovell, Summit, N. J., assignor to Bell Telephone Laboratories, Incorporated, New York, N. Y., a corporation of New York Application March 1, 1954, Serial No. 413,283

3 Claims. (Cl. 179—90)

This invention relates to improvements in telephone call signal apparatus, circuits, and methods, and more particularly to improvements in telephone call signaling apparatus, circuits, and methods of the types disclosed in United States Patent No. 2,598,695 granted June 3, 1952 to Henry E. Hill and David B. Parkinson. Such calling apparatus and circuits are of the preset type and generate pulses of electric current which are suitable for transmission over voice frequency telephone channels.

An object of the present invention is to simplify and reduce the amount of equipment necessary at a subscriber's station for generating electrical signaling currents or pulses of the type required in systems cooperating with the arrangements disclosed in the above-identified Hill and Parkinson patent.

More particularly, this invention is directed to a subscriber's station in which the complicated relay distributor employing various crystal rectifiers in combination with reed-type relays is replaced by a distributor comprising a plurality of impulse coils and rectifiers operated by means of power supplied over the subscriber's line.

In the above-identified patent to Hill and Parkinson, call signal generating apparatus is disclosed for generating pulses in which the magnitude or identity of each digit of the called subscriber's station identification or number is represented by the time elapsing between a start or reference pulse and a stop or digit pulse. In transmitting pulses of short duration over voice frequency transmission paths difficulty is frequently encountered due to transients set up by the pulses. The transients are usually decaying alternating currents which are caused by resonant circuits incorporated in the transmission paths, repeat coils, filters, and other transmission equipment. Transients resulting from the application of short pulses to such equipment frequently last a number of cycles and thus persist for an appreciable interval of time after the exciting pulse has terminated.

In accordance with the invention set forth in the above-identified Hill and Parkinson patent, the signaling pulses are spaced in time so that ample time is allowed for the transients, associated with or appearing incident to the application of each of the signaling pulses to the transmission system, to die out sufficiently so that they will not interfere with the next signaling pulse. In this manner, interaction between the various pulses or between the transients arising incident to one pulse and the succeeding signaling pulse is prevented.

As disclosed in the above-identified patent, a plurailty of reed-type relays are combined in a distributor circuit with a plurality of crystal rectifiers or diodes to form a distributing circuit which is arranged to advance one step for each half cycle of an applied alternating current.

In accordance with the present invention, a simplified distributor circuit is provided comprising a plurality of impulse coils each of which has two windings so proportioned that when alternating currents of two different phases are applied to the respective windings of each of the coils, the coils are actuated so pulses are generated at different intervals during each half cycle of the applied alternating current. These pulses are then employed to actuate diode gate circuits in succession for selecting the signals transmitted in accordance with the desired called number.

The foregoing and other objects and features of the invention will be apparent from the following description, the appended claims, and the drawings in which:

The figure shows the manner in which the dialing apparatus, the stepping mechanism, the pulse generating coils or transformers, and other equipment are interconnected to cooperate one with another and with the telephone line.

One manner in which the apparatus disclosed herein may be incorporated in a complete telephone system is disclosed in United States Patent No. 2,620,399 granted to W. A. Malthaner on December 2, 1952. Suitable types of equipment for responding to the signaling pulses transmitted from the apparatus disclosed herein are disclosed in United States Patents No. 2,603,715 granted July 15, 1952 to H. E. Vaughan and No. 2,658,188 granted November 3, 1953 to W. A. Malthaner, N. D. Newby and H. E. Vaughan.

In the exemplary embodiment described herein, provision is made for the generation of pulse representations of ten characters during each cycle of operation, and these pulses are repeatedly generated as long as the excitation current is applied. Any arbitrarily chosen number of representations of characters (within reasonable limits) may be generated by properly designed signaling apparatus. A maximum of ten representations of characters was selected for this disclosure since ten character calling numbers are used in some telephone systems. It will be understood that these characters may be digits or letters or a combination of the two as commonly used in designating telephone stations. Each of the digits 0 to 9 is represented by a different combination of two pulses; the pulse combination representing the digit 2 will also represent the letters A, B and C; the pulse combination representing the digit 3 will also represent the letters D, E and F; and so on. Hereinafter each combination of ten characters will be referred to as each called number irrespective of whether the combination comprises digits or letters or both letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words, each transmitted pulse of approximately 1-millisecond duration is in effect lengthened to a decaying alternating current of approximately 3½ milliseconds duration. At the end of this 3½-millisecond period or any time thereafter a second pulse may be transmitted.

The signaling system employed in the exemplary embodiment of the invention described herein comprises a start pulse of 1-millisecond duration for each character, the start pulses being generated at 12½-millisecond intervals as long as the pulsing transformers are energized, and a stop pulse of 1-millisecond duration for each character, each stop pulse reaching its peak value during the 4 to 8½-milisecond intervals of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, nine increments of time of ½ millisecond each for the generation of a pulse at any one of the ten times necessary to represent the various digits, and a last increment of time of 4 milliseconds, all of the latter being required to permit a stop pulse to decay if it should occur at the end of the ninth increment of time. Consequently, 12½ milliseconds of time elapse between the start pulses of succeeding digits, from which it follows that 12½ milliseconds is required in this exemplary system to transmit each character designating the called number. Thus, a time interval of 125 milliseconds is required to transmit each ten digit called number. In order to indicate the starting point of the transmission of a called number, a time interval of approximately 225 milliseconds during which no pulses are transmitted is provided between each complete series of pulses representing a complete ten digit called number.

In accordance with this exemplary embodiment of the invention, the signaling pulses are generated by saturation-type pulse generating transformers. There are eleven pulsing transformers, one for each of the numerals 0 to 9 and one for the start or reference pulse. The excitation current for the apparatus may be obtained locally at the subscriber's station or, as in the exemplary embodiment set forth herein, the excitation current for the pulse coils is transmitted from the central office over the simplex circuit of the line which interconnects the signaling station with the central office. This current is an alternating current of substantially sinusoidal wave form, and at the signaling station in the exemplary embodiment set forth herein the current is passed through phase shifting networks so that the current is converted to a two-phase source in which the two currents are substantially 90 degrees out of phase.

Each of the pulse generating transformers has a single winding secondary and two primary windings. The primary windings of the transformers are serially interconnected and connected with the two phases of the excitation current so that one phase of the excitation current is applied to one primary winding of each transformer and so that the other phase of the excitation current is applied to the other primary winding of each transformer. The secondary windings of thetransformers are connected across the line through a selector switch and distributor.

The magnetic core of each pulse generating transformer is designed to be saturated except for very small values of ampere turns, and an electric pulse is generated in the secondary winding of each transformer when the flux is changed from saturation of one polarity to saturation of the other polarity. The flux generated in the core of each transformer with two primary windings depends upon the number of turns in the two primary windings of the transformer and upon the current flowing in each winding. In this embodiment of the invention the maximum value of the currents in the circuits associated with each phase are equal. Thus, the flux induced in the core of each transformer with two primary windings depends upon the number of turns in the primary windings of the transformer and upon the time phase relationship between the currents flowing in the primary windings. The pulse attains a maximum value when the flux becomes zero.

For this signaling system, it is necessary that all pulses be substantially alike as to wave form and amplitude and that each combination of two pulses representing a digit be of the same polarity. The area under a voltage time curve representing the pulse is proportional to the total change in flux and to the number of turns in the secondary winding. High intensity energization will produce a high, short pulse, while lower energization will produce a wider pulse having the same area. Thus, if all pulses are to be alike the total maximum ampere turns on each core must be equal. Assuming equal maxima in the currents of the two phases and a 90-degree phase displacement then for pulses of equal amplitude and shape the terms $N_A$ and $N_B$ of the two primary windings of each of the transformers must be such that $$\sqrt{N_{A_1}^2+N_{B_1}^2}=\sqrt{N_{A_2}^2+N_{B_2}^2}= \ldots =\text{a constant}$$

where $N_{A_1}$, $N_{A_2}$, etc. are the number of turns in the primary winding of the transformers which is connected to phase A of the excitation current and $N_{B_1}$, $N_{B_2}$, etc. are the number of turns in the other primary winding of the corresponding transformers which is connected to phase B of the excitation current. If these conditions are met and if the cores and secondary windings of all the transformers are alike the pulses will be suitable for signaling purposes.

In order to cause each transformer to generate a pulse at a suitable time during each half cycle of the excitation current, the total ampere turns driving flux through the transformer cores must be controlled so that the flux in each transformer is zero at the time assigned to the pulse which that transformer serves to generate. This means that $$N_A I_A - N_B I_B = 0$$

must be satisfied at the time the pulse is a maximum, where $N_A$ and $N_B$ are as defined above and $I_A$ and $I_B$ are the currents through $N_A$ and $N_B$ respectively. If each phase of the excitation current is of sinusoidal wave form and both phases of equal maximum amplitude, then the timing is determined by the turns ratio as follows:

$$I_A = I_0 \cos \omega t$$

$$I_B = I_0 \sin \omega t$$

and substitution gives $$N_A I_0 \sin \omega t - N_B I_0 \cos \omega t = 0$$

or $$\frac{N_B}{N_A} = \tan \omega t$$

where $I_A$, $I_B$, $N_A$ and $N_B$ are as defined above, $I_0$ is the maximum current supplied by each phase of the excitation current, $\omega$ equals the frequency in cycles per second multiplied by $2\pi$, and $t$ is the time in seconds.

Thus, when the angular position of the desired pulse is fixed in relation to each half cycle of the excitation current, the number of turns and the polarity of the winding are given by these equations.

Since the magnetic flux in each transformer is reduced to zero two times during each cycle of the excitation current, it follows that a combination of two pulses representing a digit must occur during each half cycle of the excitation current and that each combination of two pulses representing a digit are of opposite polarity to the preceding two pulses.

Transformers 40 and 50 through 59, inclusive, have two primary windings A and B. Transformer 40 is employed to generate start pulses while transformers 50 through 59 serve to generate the stop or digit pulses. Pulse transformers 40 and 50 through 59, inclusive, are interconnected so that the primary "A" windings of the transformers are connected in series and connected to the excitation current through phase shifting network 41 and so that the primary B windings of the transformers are connected in series and connected to the excitation current through phase shifting network 42. The phase shifting networks are of conventional design and serve to apply an alternating current to the A windings of the transformers which is displaced 90 degrees in time phase relationship from the alternating current applied to the B windings of the transformers.

The alternating current from energizing the primary windings of the post impulses 40 and 50 through 59 is supplied from source 100 which is shown at the central switching station. This source is connected through the primary winding of transformer 105 at the central office to both line conductors extending to the signaling station. The phase splitting networks 41 and 42 are connected to the center point of the right-hand winding of transformer 110. Thus, the alternating current flows from the grounded source 100 and then through both halves of the primary winding of transformer 105 and over the line conductors and through both halves of the right-hand winding of transformer 110, which circuit is sometimes called the simplex circuit of the line, and then through the phase splitting networks 41 and 42 and then through the respective primary windings of the pulse generating coils or transformers 40 and 50 through 59 and ground through respective resistors 44 and 45.

As discussed hereinbefore, each of the transformers 40 and 50 through 59, inclusive, is designed so that its core is saturated except for very small values of flux. Thus, a short pulse is generated in the secondary winding of each transformer when the total flux in the core of that transformer passes through zero.

Since transformers 40 and 50 through 59, inclusive, are connected to both phases of the excitation current, the ampere turns generated in each transformer will equal the sum of the ampere turns generated by each phase winding. As discussed hereinbefore, since the maximum value of the current in each phase is equal and since the time phase relationship between the two alternating currents is fixed, the time at which the sum of the ampere turns and consequently the flux in each transformer passes through zero magnitude is governed by the number of turns in each phase winding. The generation of pulses at the respective times is described in detail in the above-identified patent of Hill and Parkinson. In each case the stop or digit pulse or voltage is induced in the output winding when the sum of the ampere turns in both windings equals zero. During each half cycle of the energizing alternating current two pulses, i. e., a start pulse and a stop pulse are induced during each complete half cycle of the applied alternating current, and in each case such successive pulse is of opposite polarity to the preceding pulse generated by the same transformer.

The secondary windings of the pulse transformers 40 and 50 through 50 are connected through the selector switch 130 and the magnet distributor arrangement described hereinafter to the line circuit. The secondary windings of the pulse transformers 40 and 50 through 59 are interconnected through the selector switch 130 with the primary windings of the gate transformers 60 through 69 and condenser 72.

Condenser 72 is proportioned relative to the iterative impedance of the line and relative to the impedance of the secondary windings of coils 40 and 50 through 59 and the primary impedance of coils 60 through 69 so that each half cycle pulse as generated by the pulse transformers 40 and 50 through 59 is applied through the condenser 72 to the primary windings of the gate transformers 60 through 69, inclusive, as a substantially complete cycle of alternating current of substantially sinusoidal wave form and having a period of each complete cycle of alternating current which is approximately equal to the time of each of the half cycle pulses generated by the transformers 40 and 50 through 59, inclusive.

A second series of pulse coils or transformers 70 through 79 are provided for actuating the magnetic distributor arrangement. This magnetic distributor arrangement employs no moving parts and functions similar to the relay distributor comprising relays 101 through 114 of the above-identified patent to Hill and Parkinson.

Each of these transformers 70 through 79 are provided with two primary windings A and B. The A windings are all connected in series and to one of the line conductors extending to the central office and the other primary winding of each of these transformers is also connected in series and to the other line conductor extending to the central office. Sources 101 and 102 are connected to the respective line conductors at the central office. Sources 101 and 102 have a frequency much lower than source 100. As pointed out hereinbefore, each half cycle of source 100 causes two pulses representing a digit or symbol of a called subscriber's station designation to be generated. Ten such pairs of pulses are required for the complete subscriber's station designation under the condition assumed herein. As will be described, the impulse coils 70 through 79 generate a series of impulses during each half cycle of the sources 101 and 102 and a complete designation should be generated and transmitted during each half cycle. Consequently, the frequency of the sources 101 and 102 should be one-tenth of the frequency of source 100 or less. In one specific embodiment of this invention the sources 101 and 102 have a frequency of one-twelfth, a frequency of source 100.

The frequency of sources 101 and 102 are the same but these sources have a phase displacement of 90 degrees between them so that they constitute a two-phase source of alternating current, one phase of which is supplied over a circuit through one line conductor and then through one of the primary windings of coils 70 through 79 and then through resistor 46 to ground and the other phase applied in a circuit extending over the other line conductor and through the other set of primary windings of the coils 79 through 70 and resistor 47 to ground.

The sources 101 and 102 are connected to the respective line conductors through impedances or networks 109 and 108 so that these sources do not short-circuit the high frequency currents from source 100. Likewise, the high frequency source 100 is connected to the line conductors from transformer 105 through the condensers 107 and 108 so that the transformer 105 and source 100 will not effectively short-circuit or materially shunt the low frequency sources 101 and 102.

The primary windings of the distributor pulse transformers 70 through 79 are designed in a manner similar to the manner of which the pulse coils 40 and 50 through 59 are designed as described above. The cores of these transformers are saturated by the applied alternating currents except for short intervals of time during which the combined flux due to currents flowing in both primary windings passes through zero. The times at which the flux in the respective cores passes through zero are adjusted or selected for each of the coils in the manner similar to that described above and in said above-identified patent to Hill and Parkinson. Likewise, the duration of the pulse from the secondary winding is similarly adjusted by providing a core of suitable size and properly proportioning the secondary winding relative to said core. Thus the windings of the transformers 70 through 79 are proportioned so that the flux of these cores passes through zero at successive instants of time, one for each of the half cycles from source 100. Likewise, the duration of each of the pulses from the secondary windings of cores 70 through 79 is adjusted so that the pulse will be in excess to a predetermined reference voltage for a time interval slightly longer than the maximum time between the pulse generatd by start coil 40 and the No. 9 stop pulse coil 59.

It is to be noted that by transmitting the high frequency current over the simplex line circuit and the low frequency two phase currents over the individual line conductors, these two currents are readily separable at the subscriber station circuit by the means of the usual simplex coils so that frequency selective filter circuits are usually not required. If such filters are required, they may be inserted in a manner similar to the manner shown in and described in the above-identified patent to Hill and Parkinson.

A lower terminal of the secondary windings of the distributor pulse transformers 70 through 79 are connected together and to one terminal of the biasing battery 111. The other terminal of the secondary windings of transformers 70 through 79 are connected to the center point of the lower windings of the respective gate transformers 60 through 69. The lower windings of the gate transformers are also connected to a pair of diodes such as 60A and 60B for transformer 60, diodes 61A and 61B for transformer 61. The lower windings of the other gate transformers are similarly connected to other diodes as shown in the drawing. The lower terminals of all of the A diodes such as 61A, 61B, etc. are connected together and to the lower terminal of the lower winding of transformer 110. The B diodes such as 60B, 61B, etc. are all connected together and connected to the upper terminals of the upper secondary winding of the transformer 110.

The biasing battery 110 is connected to the mid-point of the secondary windings of transformer 110 and is poled or connected in such a manner that all of the diodes oppose the flow of current from the biasing battery 110. In other words, the battery 110 biases the diodes so that they present a high impedance to any voltages applied to them from the transformers. Thus, the lower or secondary windings of the gate transformers 60 through 69 are substantially open or disconnected from the secondary winding of the transformer 110. However, when a pulse from the transformer 70, for example, is generated in the secondary winding, this pulse is of such a polarity and magnitude as to overcome the voltage of battery 110 applied to diodes 60A and 60B. During the time the voltage of the pulse from transformer 70 exceeds the voltage from battery 111, the diodes 60A and 60B will present a low impedance or resistance and effectively connect the lower winding of transformer 60 to the secondary winding of transformer 110 in succession.

The right-hand terminals of the primary windings of the gate transformers 60 through 69 are all connected together and to the lower terminal of condenser 72. The lefthand winding terminals of the primary windings of transformers 60 through 69 are connected to the respective contact springs 10 through 19 of the selector switch 130. The stationary conductors 0 through 9 of the selector switch 130 are connected to the left-hand terminals of the secondary windings of the stop pulse transformers 50 through 59, inclusive.

The construction of the selector switch 130 is substantially the same as the selector switch 130 disclosed and described in the above-identified patent to Hill and Parkinson. Each of the selector switches or springs 10 through 19 is connected to a finger wheel or dial which the subscriber may position in any one of ten positions 0 to 9 in accordance with the respective symbols of a complete subscriber's station designation. Thus by positioning spring 10 to represent the numeral 1, contact 10 spring will be moved by the corersponding finger wheel to engage the No. 1 conductor of the selector switch which extends to the left-hand winding terminal of No. 1 pulse stop coil 51. By positioning the No. 11 contact spring to engage the No. 8 conductor of the selector switch, the circuit from this conductor extends to the left-hand terminal of the secondary winding of the No. 8 stop pulse coil 58. The other selector springs 12 through 19 are similarly positioned in accordance with the symbols of the called subscriber's station designation.

Thus, when the selector contact springs 10 to 19 position in accordance with the called subscriber's station designation, the subscriber will initiate a call in the manner described in the above-identified patent to Hill and Parkinson whereupon the signaling system shown in Fig. 1 is connected to the line conductors and the sources of alternating current are connected to the line conductors at the central office by means of suitable switching apparatus and equipment similar to that described in the above-identified patent to Hill and Parkinson and similar to the central office switching equipment referred to in said patents, such as United States Patents 2,603,715 and 2,658,118, identified above.

Upon supplying the alternating current from sources 101 and 102 to the subscriber's line, a pulse will be generated in the secondary winding of the distributor transformer 70 which pulse renders the diodes 60A and 60B conducting. Consequently, when the selector switch 10 is in No. 1 position, the circuit will be completed from the right-hand terminal of the primary winding of the gate transformer 60 and through condenser 72 and secondary winding of the start pulse coil 40 and the secondary winding of the stop pulse coil 51, conductor 1 and selector spring 10 to the left-hand terminal of the primary winding of the gate transformer 60. Thus, during the time the positive pulse is obtained from the secondary winding of the distributor transformer 70, the start pulse from transformer 40 and the stop pulse generated by the pulse transformer 51 are applied to the primary winding of the gate transformer 60. Inasmuch as the diodes connected to the secondary or lower winding of this transformer are in their low conduction state at the present time, these two pulses are transmitted through the transformer 110 and then over the subscriber's line and through the receiving transformer 105 at the central switching station to the signal receiving equipment located at the central switching station.

At the termination of the pulse from the secondary winding of the transformer 70, the diodes 60A and 60B become non-conducting and effectively disconnect or dissociate the secondary winding of the gate transformer 60 from the coil 110.

A short interval of time later, positive pulse is obtained from the secondary winding of the pulse transformer 71 which renders the diodes 61A and 61B conducting. Consequently, a start pulse from coil 40 and a stop pulse from coil 58 will be transmitted through the gate transformer 61 and then through transformers 110 and 105 to the signal receiving circuit. In a like manner pulses representing the other symbols or digits of a subscriber's station designation are transmitted over the subscriber's line to the central switching station. Thus, during one half cycle of the low frequency alternating current which half cycle may be conveniently designated a positive half cycle (it could be well designated the negative half cycle), a series of pulses from the pulse generated coils 40 and 50 through 59 are generated and applied to the subscriber's line circuit extending to the central switching station. During the next half cycle of the low frequency energizing current negative pulses are obtained from the secondary windings of the distributor pulse transformers 70 and 79 so that the gate transformer remains effectively disassociated from the line circuit. However, during the succeeding half cycle another series of positive pulses are obtained from the secondary windings of the distributor pulse transformers 70 through 79 which pulses cause signals representing the complete subscriber's station designation to be again transmitted over the subscriber's line to the central switching station. The above action of the circuits then continues as long as the sources of alternating current are connected to the line at the switching station and as long as the pulse generating and transmitting equipment of Fig. 1 remains connected to the subscriber's line.

The start or synchronizing pulse, as well as the digit pulses, is transmitted from the transformer 110 over the line conductors extending to the central switching station. At the central switching station these signaling pulses are transmitted through the coupling condensers 106 and 107 and through transformer 105 to the signal receiving circuits. These signal receiving circuits may be interconnected with the subscriber's line in any suitable manner, such as for example, as disclosed in the above-identified patents.

The signal receiving circuits respond to the received impulse signals and control a switching equipment at the central station in response thereto in any suitable manner such as described in the above-identified patents. After the signaling paths have been established the alternating-current sources 100, 101 and 102 will be removed from the line as will the receiving signaling circuits, and other equipment at the subscriber station will be interconnected with the line to permit communication from the calling subscriber over the path established through the switching system in response to the signals representing the called station's designation. Typical manners of so operating switching systems are disclosed in the above-identified patents. Where desirable, the signaling or calling equipment shown in Fig. 1 may be disconnected from the line termination of a signaling period in the manner described in the above-identified patents.

It is to be understood that the above-described arrangements are illustrative of an application of the principles of this invention. Numerous and other arrangements and modifications may be devised by those skilled in the art without departing from the spirit and scope of the invention.

What is claimed is:

1. In a telephone dialing system, apparatus for generating a start pulse and a plurality of stop pulses representing the identity of the numerals of a called designation, a plurality of manually operable selector switches, an electromagnetic distributor comprising a plurality of gate transformers and a similar plurality of distributor impulse generating coils, an output circuit, interconnecting circuit means for interconnecting said manually operable selector and said apparatus for generating pulses identifying the numerals of a called designation for extending a different pulse transmission path to said output circuit through each of said gate transformers, means for interconnecting said distributor impulse coils with said gate transformers, and means for energizing said distributor impulse coils in succession for successively generating activating pulses for each of said gate transformers whereby a path is successively and operatively established for transmitting said pulses designating the numerals through said gate transformers to said output circuit.

2. In a telephone calling system, in combination, a subscriber's line, apparatus for generating calling signals representing symbols of a called station designation, a manual selector switch for selecting different ones of said signals, an electromagnetic distributor connected to said switch and comprising a plurality of gate transformers, and a plurality of distributor impulse coils and means for energizing said distributor impulse coils for successively generating impulses thereby, means for connecting said impulse coils to said gate transformers for establishing a transmission path from said gate coils to said subscriber's line, for the transmission of selector signals through said gate coils to said subscriber's line.

3. In a telephone signaling system, in combination, a plurality of saturable core impulse generating coils for generating impulses representing the identity of symbols of a called station designation, a plurality of manually operable selector switches for selecting said impulses, a gate transformer individual to and individually interconnected with each of said manually operable selector switches, a subscriber's line circuit, a diode interconnected between each of said gate transformers and said subscriber's line circuit, bias means for biasing said diode to its non-conducting state, a distributor impulse coil individual to each of said gate transformers, means for energizing said distributor impulse coils in succession, and means for applying impulses to said gate transformers for overcoming said bias and rendering said diodes conductive during said impulse whereby selected impulses representing the identity of symbols are transmitted through said gate transformers to said subscriber's line circuit.

No references cited.